(12) United States Patent
Sanderson et al.

(10) Patent No.: US 8,382,042 B2
(45) Date of Patent: Feb. 26, 2013

(54) STRUCTURE WITH RECONFIGURABLE POLYMER MATERIAL

(75) Inventors: Terry M. Sanderson, Tucson, AZ (US); Yvonne C. Levenson, Tucson, AZ (US); David R. Sar, Corona, CA (US)

(73) Assignee: Raytheon Company, Waltham, MA (US)

( * ) Notice: Subject to any disclaimer, the term of this patent is extended or adjusted under 35 U.S.C. 154(b) by 1179 days.

(21) Appl. No.: 12/120,271

(22) Filed: May 14, 2008

(65) Prior Publication Data

US 2009/0283936 A1 Nov. 19, 2009

(51) Int. Cl.
*B64C 9/00* (2006.01)

(52) U.S. Cl. ........ 244/201; 244/204; 244/219; 335/296; 428/304.4; 428/321.1

(58) Field of Classification Search ................... 335/303, 335/296; 244/201, 204, 219; 428/304.4, 428/321.1
See application file for complete search history.

(56) References Cited

U.S. PATENT DOCUMENTS

| | | | |
|---|---|---|---|
| 2,559,827 A | 7/1951 | Northrop | |
| 3,628,352 A | 12/1971 | Stuemky | |
| 4,176,411 A * | 12/1979 | Runge | 623/3.11 |
| 5,049,591 A | 9/1991 | Hayashi et al. | |
| 5,082,207 A | 1/1992 | Tulinius | |
| 5,181,678 A | 1/1993 | Widnall et al. | |
| 5,662,294 A | 9/1997 | Maclean et al. | |
| 5,988,689 A * | 11/1999 | Lever | 285/21.1 |
| 6,010,098 A | 1/2000 | Campanile et al. | |
| 6,264,136 B1 | 7/2001 | Weston | |
| 6,308,628 B1 * | 10/2001 | Bronstein et al. | 101/467 |
| 6,628,040 B2 * | 9/2003 | Pelrine et al. | 310/307 |
| 6,705,568 B2 | 3/2004 | Lee | |
| 6,834,835 B1 | 12/2004 | Knowles et al. | |
| 7,306,187 B2 * | 12/2007 | Lavan | 244/123.11 |
| 7,699,834 B2 * | 4/2010 | Hood et al. | 604/892.1 |

(Continued)

FOREIGN PATENT DOCUMENTS

| | | |
|---|---|---|
| CN | 101028866 | 9/2007 |
| EP | 0361418 A2 | 4/1990 |

(Continued)

OTHER PUBLICATIONS

Zihlif, A.M., et al., Physical Characterization and Performance of Iron Polymer Composites, Jan. 2012, Wiley Online Library(wileyonlinelibrary.com).*

(Continued)

*Primary Examiner* — Ramon Barrera
(74) *Attorney, Agent, or Firm* — Renner, Otto, Boisselle & Sklar, LLP (57) ABSTRACT

A structure includes a polymer structural member, which may include a shape memory polymer material, that can change its size and/or shape. An electromagnetic source is used to impose an electric field or a magnetic field on the polymer structural material, in order to control the shape of the material. The force may be used to change the shape of the material and/or to maintain the shape of the material while it is under load. The polymer material may be a solid material, may be a foam, and/or may include a gel. A shape memory polymer material may have mixed in it particles that are acted upon by the electromagnetic field. The structure may be used in any of a variety of devices where shape change (morphing), especially under loading, is desired.

30 Claims, 7 Drawing Sheets

U.S. PATENT DOCUMENTS

| | | |
|---|---|---|
| 7,777,165 B2 | 8/2010 | Sanderson et al. |
| 2002/0195177 A1 | 12/2002 | Hinkley et al. |
| 2003/0036090 A1 | 2/2003 | Patil et al. |
| 2004/0086699 A1 | 5/2004 | Schneider |
| 2005/0157893 A1 | 7/2005 | Pelrine et al. |
| 2005/0206096 A1 | 9/2005 | Browne et al. |
| 2006/0192465 A1* | 8/2006 | Kornbluh et al. ............. 310/800 |
| 2007/0107189 A1 | 5/2007 | Prichard et al. |
| 2008/0061192 A1 | 3/2008 | Sullivan |
| 2009/0072094 A1 | 3/2009 | Sanderson et al. |
| 2009/0206192 A1 | 8/2009 | Sanderson et al. |
| 2009/0283643 A1 | 11/2009 | Sar et al. |
| 2009/0286101 A1 | 11/2009 | Sar et al. |
| 2010/0030308 A1 | 2/2010 | Anderson et al. |
| 2010/0282917 A1 | 11/2010 | O'Shea |

FOREIGN PATENT DOCUMENTS

| | | |
|---|---|---|
| EP | 0905019 A2 | 3/1999 |
| EP | 1607602 | 12/2005 |
| GB | 2445099 | 6/2008 |
| JP | 60145385 A | 7/1985 |
| JP | 2009047179 A | 3/2009 |
| WO | 9308013 A1 | 4/1993 |
| WO | 9324300 A1 | 12/1993 |
| WO | 03068584 | 8/2003 |
| WO | 2007001392 | 1/2007 |
| WO | 2008068472 A1 | 6/2008 |

OTHER PUBLICATIONS

Thill C. et al., "Morphing Skins", Aeronautical Journal, (2008), vol. 112, No. 1129, [retrieved from internet], <www.aer.bris.ac.uk/research/fibres/morph%20pics/RoyAeroSocMorphSkin.pdf>.

Sanderson, Terry "Shape Memory Polymer Characterization for Advanced Air Vehicle Technologies", Raytheon Technology Today, (2007), vol. 2007, No. 4, [retrieved from internet] <www.raytheon.com/technology_today/archive/2007_issue 4.pdf>.

Shaw, John A. et al., "The Manufacture of Niti Foams", Proceedings of 2002 ASME International Mechanical Engineering Congress and Exposition, (2002), pp. 1-10.

Perkins, David A. et al., "Morphing Wing Structures for Loitering Air Vehicles", 45th AIAA/ASME/ASCE/AHS/ASC Structures, Structural Dynamics & Materials Conference, (2004), pp. 1.

* cited by examiner

STRUCTURE WITH RECONFIGURABLE POLYMER MATERIAL

RELATED APPLICATIONS

This application is related to two commonly-assigned concurrently-filed applications, "Shape-Changing Structure Member with Embedded Spring" Ser. No. 12/120,273, and "Shape-Changing Structure with Superelastic Foam Material" Ser. No. 12/120,275. Both of these applications are hereby incorporated herein by reference in their entireties.

BACKGROUND OF THE INVENTION

1. Technical Field of the Invention

The invention is in the field of reconfigurable structural members.

2. Description of the Related Art

Shape memory polymer materials have been used for morphing or shape changing structures, components, and hardware. Unlike shape memory alloys, shape memory polymers do not exert enough force during shape change to overcome anything but the weakest of forces. Attempts have been made to develop structural supports to prevent the shape memory polymer material from warping out of desired shapes. However, this has been found to severely limit the shape changes that practically can be achieved.

It will be appreciated that there is room for improvement in the area of use of shape memory polymer materials.

SUMMARY OF THE INVENTION

According to an aspect of the invention a structural member includes: a polymer structural material; and an electromagnetic field system operatively coupled to the polymer structural material to control shape of the polymer structural material.

According to another aspect of the invention a method of altering shape of a structural member includes the steps of: applying an electromagnetic force to a shape memory polymer material of the structural member; while still applying the electromagnetic force, heating the shape memory polymer material above a glass transition temperature of the shape memory polymer material; and while still applying the electromagnetic force, altering shape of the shape memory polymer material.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A structure includes a polymer structural member, which may include a shape memory polymer material, that can change its size and/or shape. An electromagnetic source is used to impose an electric field or a magnetic field on the polymer structural material, in order to control the shape of the material. The force may be used to change the shape of the material and/or to maintain the shape of the material while it is under load. The polymer material may be a solid material, may be a foam, and/or may include a gel. A shape memory polymer material may have mixed in it particles that are acted upon by the electromagnetic field. The structure may be used in any of a variety of devices where shape change (morphing), especially under loading, is desired. Examples of possible applications include use in airframes, use in land vehicles or watercraft, and mirrors and sunshades.

Figure 1:
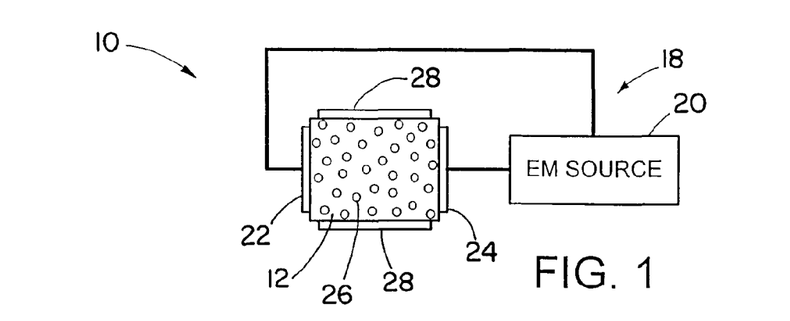
FIG. 1 is a diagram showing the functional relationship of parts of a structural member in accordance with an embodiment of the invention.

FIG. 1 shows a generalized configuration of a structural member 10 that includes a shape memory polymer material 12. The shape memory polymer material 12 may be a foam or a solid material, the latter defined herein has a material that is substantially without voids.

As is known, shape memory polymer materials and other materials may be heated above a glass transition temperature or plastic temperature, to enable them to change their shape. However, when doing so it may be desirable to have the shape memory polymer material 12 still able to resist some forces on it, such as external structural forces on the structural member 10. This ability to resist loads is greatly reduced when the shape memory polymer material 12 is sufficiently heated so as to soften it to allow it to change shape. For example, during shape change the Young's modulus of shape memory polymer foam is relatively low, and therefore the foam material may not be able to carry significant loads. Some mechanism may be needed to increase the stiffness of the material when it is in this condition, in order to have the material resist loads.

In order to maintain the ability of the structural member 10 to resist loads, and to control the shape and configuration of the shape memory polymer material 12, the structural member 10 includes a shape-controlling electromagnetic field system 18. The electromagnetic field system 18 includes an electromagnetic source 20 and a pair of electromagnetic elements 22 and 24. As shown in FIG. 1, the electromagnetic elements 22 and 24 may be on opposite sides of the shape memory polymer material 12. It will be appreciated that a wide variety of number, size, and configuration of electromagnetic elements are possible. For example, the electromagnetic elements 22 and 24 may be plates or wires. As another example the electrical elements may be metal foil elements embedded in surfaces of the structural member 10. It will be appreciated that the electromagnetic elements may be located in any of a variety of places within the structural member 10.

The electromagnetic field system 18 may provide an electric field and/or a magnetic field for controlling shape of the shape memory polymer material 12. Thus the electromagnetic elements 22 and 24 may be electrical elements, such as capacitor plates. Alternatively, the electromagnetic elements 22 and 24 may be magnetic field elements, such as coils.

The electromagnetic elements 22 and 24 may act on an inherent property of the shape memory polymer material 12. For instance, the electromagnetic field system may set up an electric field that acts on a dielectric constant of the shape memory polymer material 12.

The shape memory polymer material 12 may have particles 26 interspersed within it that are acted upon by the electromagnetic field system 18. The particles 26 may be magnetic particles that receive a force when acted upon by magnetic field set up by the electromagnetic field system 18.

The magnetic particles may be magnetite particles. Particles that respond to an electrical field may be piezoelectric material particles. Additives to the shape memory polymer material 12 to increase its dielectric constant may include titanates or titanium compounds. Any sort of suitable particles with a high dielectric constant would be useful for this purpose. The particles 26 may be micron-size to nano-size particles.

The electromagnetic field system 18 may be used to heat the shape memory polymer material 12 in order to soften the material to change its shape. Alternatively or in addition one or more separate heating elements 28 may be used to heat the shape memory polymer material 12. The heating elements 28 may be of any of a variety of different types of heaters on the material 12, in the material 12, or otherwise affecting the material 12. Possibilities include RF microwave heating or magnetic induction heating. Electrical resistance heating (e.g., burn wire or burn foil) or thermochemical heating are other possibilities.

It will be appreciated that a wide variety of suitable additives may be used to make a polymer a shape memory polymer. The glass transition temperature and other characteristics of the shape memory polymer material may be controlled by the type and amount of additives. Other characteristics for the shape memory polymer material may be suitability for the chemical or other environment that the material is exposed to. The shape memory polymer material 12 may be either a polyurethane-based material or an epoxy-based material. Cyanate-ester-based materials may also be utilized. It will be appreciated that a wide variety of other polymers may be utilized. Foam materials have the advantage of having much greater strain capacities than neat resin materials. However, it will be appreciated that foam materials have less stiffness than solid materials. The Poisson's ratio of the neat resin may be around 0.4 to 0.5. This will result in significant lateral expansion and contraction of the foam material 12 with change of wingspan, unless some force is applied to hold the shape memory polymer material at the desired outer mold line. The Poisson's ratio of the shape memory polymer foam may be less than 0.1.

It will be appreciated that the polymer material 12 need not necessarily be a shape memory polymer material. Elastomers or elastomer foams without shape memory properties may be used, with their shape controlled by electromagnetic forces, as described herein. However, shape memory polymers are advantageous in that such polymers, if handled properly, do not permanently set in a given shape or position. Although the various embodiments are described herein with reference to shape memory polymer materials, it should be understood that these references are intended to also include polymer materials that do not have shape memory properties.

Figure 2:
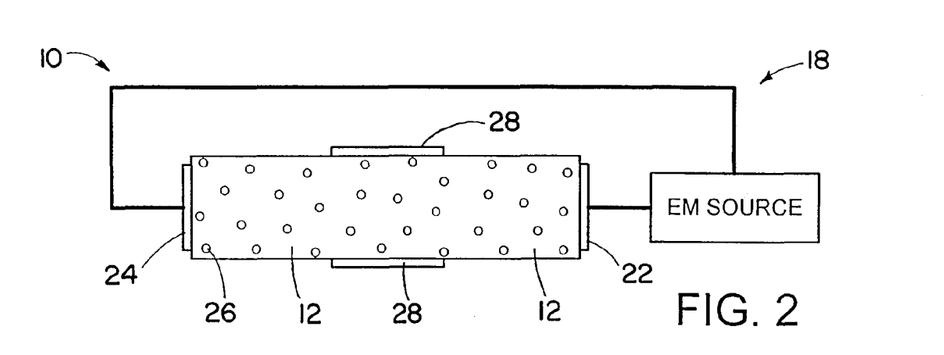
FIG. 2 shows the structural member of FIG. 1 in an extended configuration.

FIG. 2 illustrates a change of shape of the structural member 10. This change of shape may be accomplished by heating the shape memory polymer material 12 above its glass transition temperature, applying a force on the shape memory polymer material 12 to cause it to change shape, and cooling the shape memory polymer material 12 in its new shape. As described above, the electromagnetic field system 18 may be used for providing a force on the shape memory polymer material 12 to cause it to change shape. Alternatively or in addition the electromagnetic field system 18 may be used to counteract internal or external forces, such as structural loads, that would otherwise cause undesired shape changes in the shape memory polymer material 12, while the material 12 was in its softened state. Applying the electromagnetic field between the electrical elements 22 and 24 may serve to confine the shape memory polymer material 12 between the electromagnetic elements. In addition the fields put out by the electromagnetic elements 22 and 24 may cause the electromagnetic elements 22 and 24 to either attract one another, bringing them together, or repel one another, pushing them apart.

A variety of sources may be used for the force that causes the shape change in the shape memory polymer material 12. As noted in the previous paragraph, the electromagnetic field system 18 may provide some or all of the force causing the change in the shape of the material 12. Other parts of the structural member 10 may be used to change the shape of the shape memory polymer material 12 by applying mechanical forces to the shape memory polymer material 12. Also to some extent external loading or external forces, forces from outside of the structural member 10, may be used in changing the shape of the shape memory polymer material 12. Finally, the shape memory characteristics of the material 12 may be utilized in changing shape of the shape memory polymer material 12. Such shape memory materials may be configured so that they have a tendency to return to a given shape when heated. A shape memory polymer material has a characteristic that it is able to freeze strain energy into the material as it goes back and forth across a glass transition. The forces produced by the strain energy in the material are weak, but may accomplish movement when not opposed by strong forces.

FIG. 2 illustrates a one-dimensional stretching of the shape memory polymer material 12. It will be appreciated that a wide variety of other changes in shape and configuration of the material 12 are possible. The shape changes may involve morphing, which is used herein to indicate shape changes that maintain a substantially continuous surface of the structural member 10.

Figure 3:
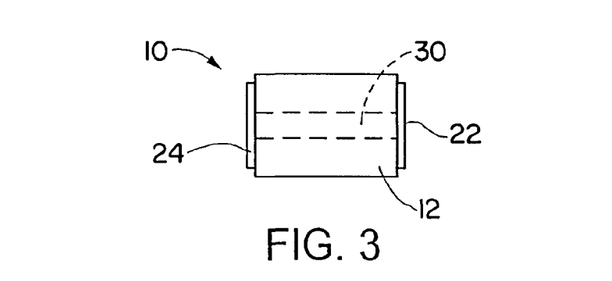
FIG. 3 shows a variation of the structural member of FIG. 1, with an internal skeleton.

FIG. 3 illustrates a variant in which the structural member 10 includes a skeleton 30, one or more rigid members that underlie or otherwise support the shape memory polymer material 12. The skeleton may be made of a suitable rigid material, such as a suitable metal. The shape memory polymer material 12 may be a skin that provides an outer surface for the structural member 10, with the skeleton 30 being a load-bearing member that provides most of the strength of the structural member 10. The skeleton 30 may itself be able to change shape, for example by being provided with an actuator to allow it to change its length, or by having parts slide relative to each other. Such actuation may be done with any of a variety of forces, such as by use of hydraulics, electric motors, or piezoelectric materials. It will be appreciated that providing a continuous surface is desirable in a large number of situations, for example in reducing drag of aircraft and other moving vehicles.

Figure 4:
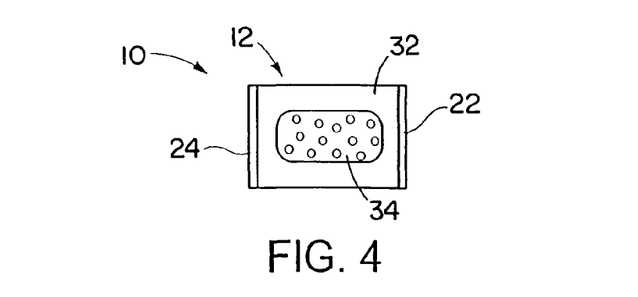
FIG. 4 shows another variation of the structural member of FIG. 1, utilizing a gel as part of the shape memory polymer material.

FIG. 4 shows another variation of the structural member 10, in which the shape memory polymer material 12 includes outer foam 32 that surrounds an inner gel 34. A gel may be easier to transform in shape than a corresponding solid. The gel 34 may also have the advantage of more easily and more uniformly spreading the particles 26. Further, the gel 34 may present less of a leakage problem than a liquid material. The gel 34 may be a polymer material, such as those described herein. The gel 34 may have magneto-rheological properties, for example having magnetite powder added, in order to provide a variable stiffness reinforcement system.

As another alternative, gel materials may be impregnated throughout all or parts of a polymer material, such as a polymer foam. Shape change may be accomplished by applying electromagnetic forces to the gel, for example by acting on magnetic particles suspended in the gel. By varying the strength of the magnetic field, wide variations in viscosity may be achieved, up to conditions where the gel behaves nearly as a solid.

Figure 5:
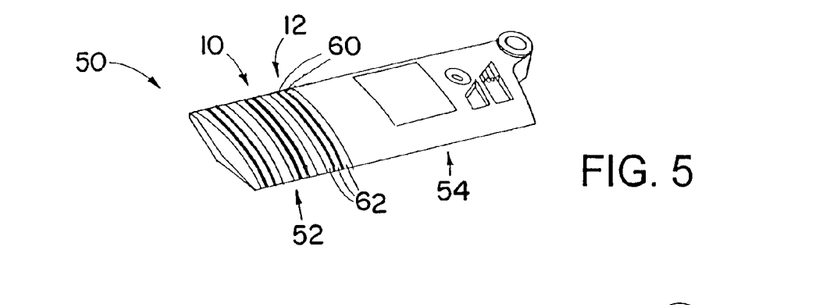
FIG. 5 shows one application of a structural member in accordance with the present invention, an extendable wing, with the wing illustrated in the retracted configuration.
Figure 6:
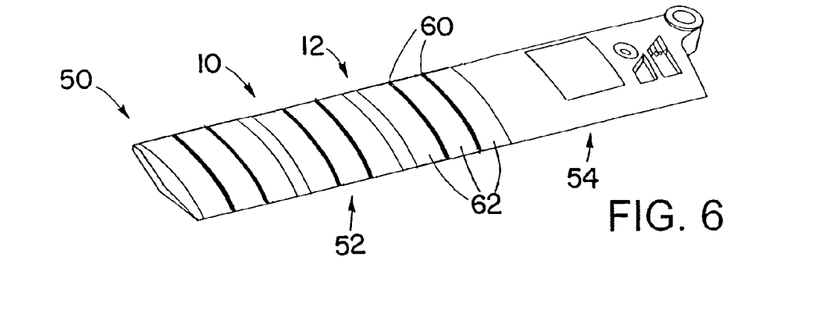
FIG. 6 shows the wing of FIG. 5 in an extended configuration.

FIGS. 5-8 illustrate one use for the structural member 10, as an extendable portion of an aircraft wing 50. FIG. 5 shows a short wingspan configuration of the wing 50, with the structural member 10 in a retracted configuration. FIG. 6 shows the same wing 50 in a long wingspan configuration, with the structural member 10 extended. The structural member 10 is at an outer distal portion 52 of the wing 50. A proximal portion 54 of the wing 50 does not change its link or configuration.

Figure 7:
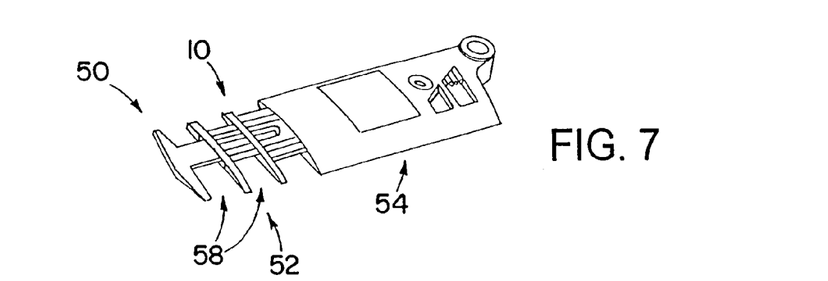
FIG. 7 shows the wing of FIG. 5 with the shape memory polymer material removed to show underlying extendable skeleton sections.
Figure 8:
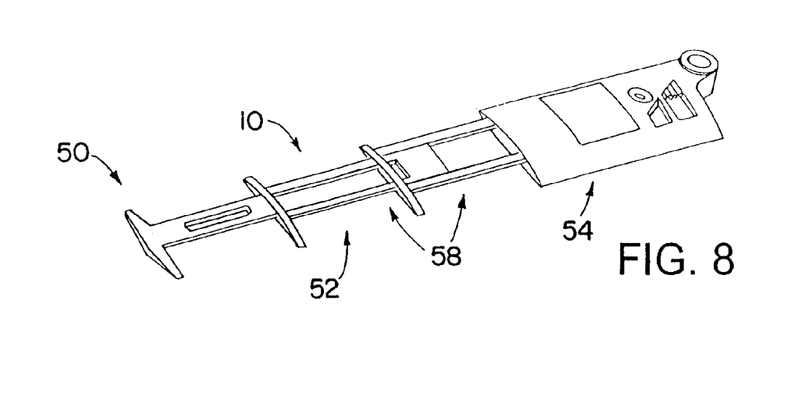
FIG. 8 shows the wing of FIG. 5 in an extended configuration, with the shape memory polymer material removed to show the underlying extendable skeleton segments.

FIGS. 7 and 8 show the wing 50 in retracted and extended positions with the shape memory polymer material 12 omitted, illustrating the underlying extendable skeleton segments 58. There are three extendable skeleton segments 58 that slidably engage one another and the proximal wing portion 54. Various known actuating systems can be used to extend the skeleton segments 58 from the retracted position, shown in FIG. 7, to the extended position shown in FIG. 8. Alternatively, the skeleton segments 58 may be passive in operation, only providing structural rigidity, and not being used in driving the extension or retraction process.

The wing distal portion 52 has plural slabs 62 of shape memory polymer material 12, separated by electromagnetic elements 60. There are multiple of the shape memory polymer material slabs 62 corresponding to each of the extendable skeleton segments 58. It is expected that the shape memory polymer material slab 62 will be extended or retracted one at a time. The slabs 62 individually are heated, have their shape changed, and are cooled, while the other slabs are maintained in a substantially rigid state. Electromagnetic forces are used to provide some stability to the individual slab while it is in a softened or plastic condition that allows shape change.

The electromagnetic elements 60 may be used both for heating the shape memory polymer material 12 and for extending or retracting the shape memory polymer material slabs 62. Alternatively, the heating may be accomplished in whole or in part by separate heating elements. The electromagnetic elements 60 may be electrically conductive coils. Electromagnetic energy may be injected into the coils to inductively heat one of the shape memory polymer material slabs 62. Coils may then be pulsed with direct current (DC) to drive adjacent of the coils together or apart. A minimal attracting field between the coils may be maintained to hold the shape of the individual shape memory polymer material slab 62 until cooling has solidified that slab. Additional elements may be positioned to provide magnetic fields or holding the slab 62 in place while it cools, for example being placed on the top and bottom surfaces of the shape memory polymer material slab 62. It will be appreciated that such a mechanism for providing the force for extending and retracting the structural member 10 may obviate any need for an actuation system for the extendable skeleton segments 58. The segments 58 may be passive in operation, only providing structural rigidity, and not being used in driving the extension or retraction process.

The change in wing length may be performed to optimize speed-related characteristics of an aircraft. Longer wings may be more suitable for long-duration low-speed flying, while shorter wings may be more suitable for faster speeds.

Figures 9, 10:
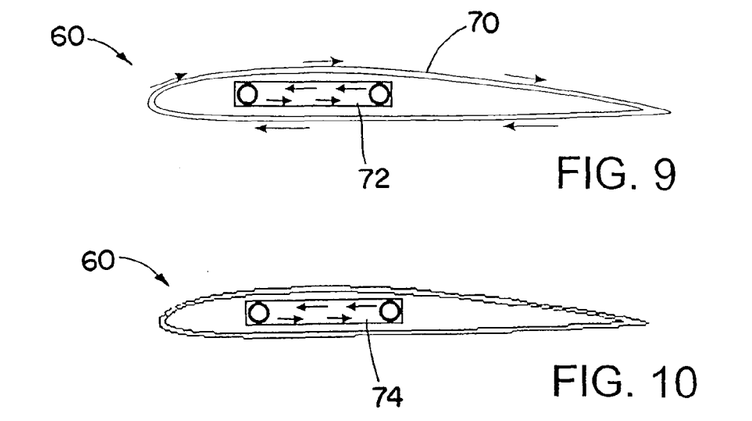
FIG. 9 is a cross sectional view showing one possible electromagnetic element configuration usable with the wing of FIG. 5.
FIG. 10 is a cross sectional view showing a second possible electromagnetic element configuration usable with the wing of FIG. 5.
Figure 11:
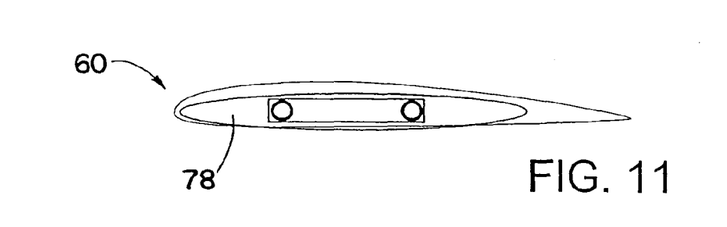
FIG. 11 is cross sectional view showing a third possible electromagnetic element configuration usable with the wing of FIG. 5.

FIGS. 9-11 illustrate various configurations for the electromagnetic elements 60. FIG. 9 shows a configuration for producing opposing magnetic fields. In this configuration the electromagnetic element 60 has an outer current loop 70 and an inner current loop 72. Current is passed through the current loop 70 and 72 in opposite directions, clockwise in one of the current loops and counterclockwise in the other current loop.

FIG. 10 shows an alternative configuration for the electromagnetic element 60. The configuration shown in FIG. 10 has only a single current loop 74 for providing current flow in a single direction. The configuration shown in FIG. 10 is usable in conjunction with magnetic particles in the bulk shape memory polymer material.

The electromagnetic element configuration shown in FIG. 11 involves a capacitor plate 78 for producing an electric field. The capacitor plate 78 has an elliptical shape that allows it to fit within a section of the wing 50. It will be appreciated that capacitor plates may have any of a wide variety of suitable shapes.

Figure 12A:
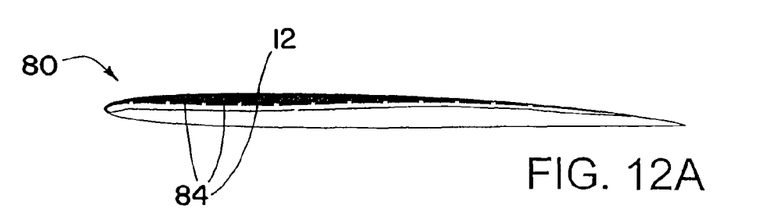
FIG. 12A shows an aircraft wing in accordance with an embodiment of the invention that is able to vary in thickness, with the illustration showing a relatively thin high-speed wing configuration.
Figure 12B:
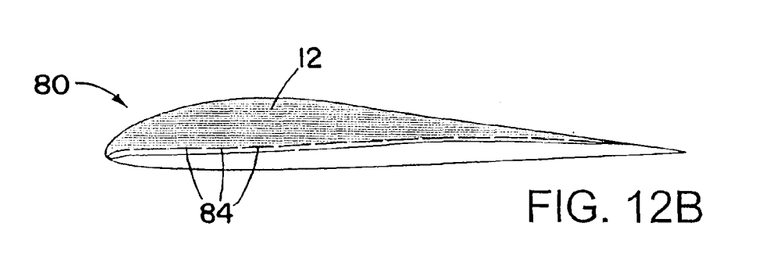
FIG. 12B is a cross sectional view of the wing of FIG. 12A in a relatively thick low-speed wing configuration.

FIGS. 12A and 12B illustrate another embodiment, an aircraft wing 80 that has shape memory polymer material 12 along an upper surface. Electromagnetic elements 84 are located underneath the polymer material 12 to provide a suitable electromagnetic field in the shape memory polymer material 12. By varying the shape of the polymer material 12 the thickness, camber, and/or shape of the wing 80 may be varied. The polymer material 12 may be softened by heating, reshaped by electromagnetic fields generated by the electromagnetic elements 84, and then cooled to be able to retain the new shape. Thus the wing 80 may be made relatively thin for better performance at high speeds, as illustrated in FIG. 12, or may be made thicker for better performance at low speeds, as illustrated in FIG. 13. The electromagnetic fields generated by the electromagnetic elements 84 may be used to control stiffness within the polymer material 12 while morphing the polymer material 12 between the different possible configurations. The polymer material 12 may have suitable magnetorheological particles, for example magnetite, mixed in it.

Figures 13A, 13B:
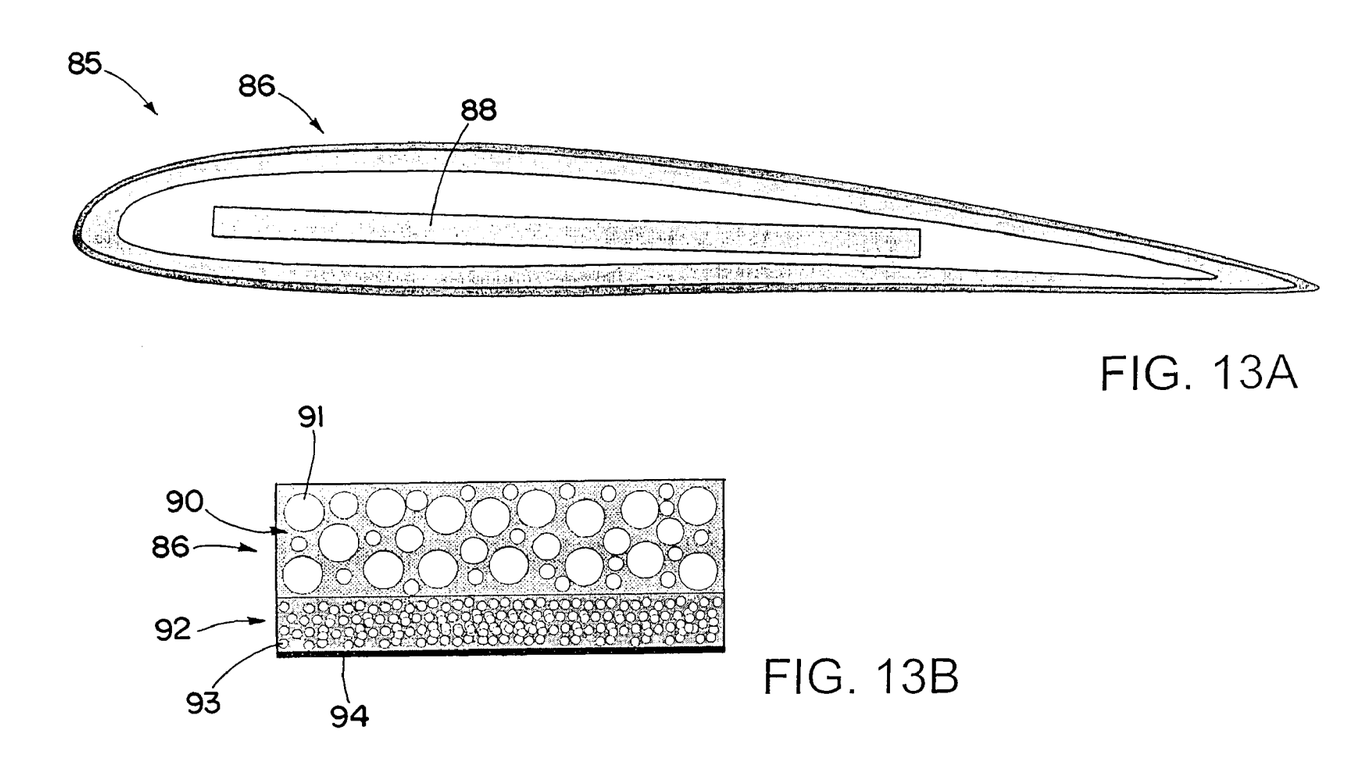
FIG. 13A shows a cross-sectional view of an aircraft wing in accordance with another embodiment of the invention.
FIG. 13B is a cross-sectional view of a part of the wing of FIG. 13A, showing details of a layered configuration.
Figure 14:
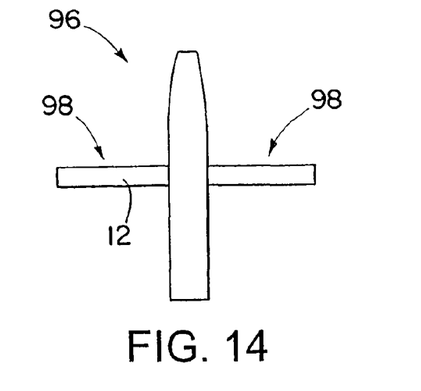
FIG. 14 is a plan view of an aircraft in accordance with an embodiment of the invention, the aircraft having configurable wings and being in a first configuration.
Figure 15:
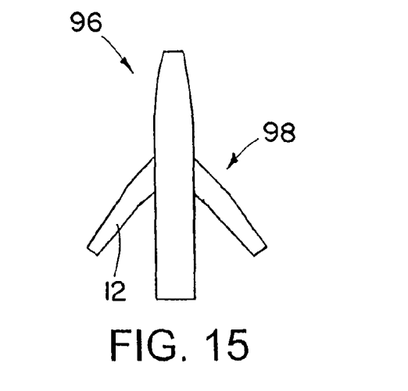
FIG. 15 is a plan view showing the aircraft of FIG. 14 in a second configuration.
Figure 16:
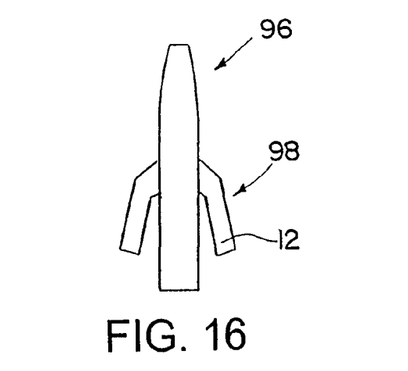
FIG. 16 is a plan view of the aircraft of FIG. 14 in a third configuration.
Figure 17:
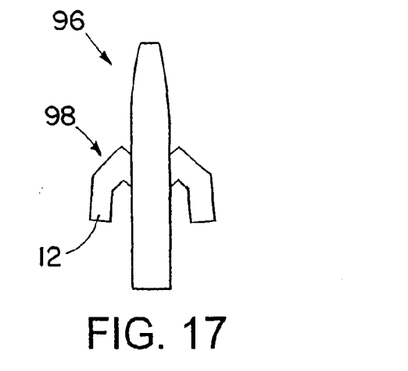
FIG. 17 is a plan view of the aircraft of FIG. 14 in a fourth configuration.
Figure 18:
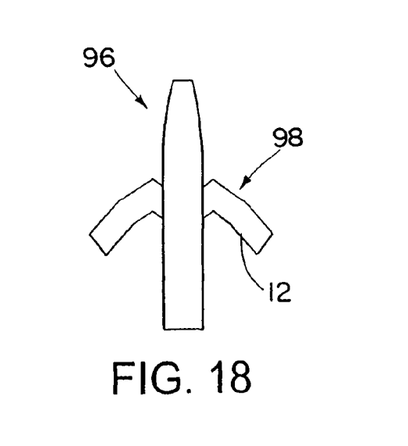
FIG. 18 is a plan view of the aircraft of FIG. 14 in a fifth configuration.
Figure 19:
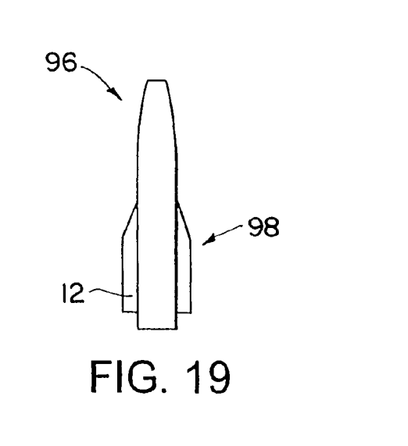
FIG. 19 is a plan view of the aircraft of FIG. 14 in a sixth configuration.

FIGS. 13A and 13B illustrate another embodiment, an aircraft wing 85 that includes a layered shape-change material 86 around a spar 88. The material 86 may include an inner coarse shape-change foam layer 90 with relatively large voids 91, a middle fine shape-change foam layer 92 with relatively small voids 93, and a surface membrane 94. The coarse foam layer 90 is capable of relatively large shape change, while the fine foam layer 92 provides greater rigidity. The membrane 94 may be a bonded thin elastomer membrane that seals pores in the foam layer 92 to minimize drag. The foam layers 90 and 92 may include a suitable polymer foam or other suitable shape-change material, for example as described herein with regard to other embodiments.

It will be appreciated that a wide variety of other applications are possible for reshaping shape memory polymer material 12. An example would be use as control surfaces for an aircraft. The entire trailing edge of a wing could be turned into an aileron, for example.

The foregoing aircraft-related examples illustrate only a few of the many possible uses of shape-changing materials. FIGS. 14-19 illustrate a number of configurations of an aircraft 96 having wings 98 made up of multiple segments that can be pivoted relative to one another, as well as being telescoped. A shape memory polymer material 12 may be used as the skin of the wings 98, having its shape changed or morphed to provide a continuous aerodynamically-suitable wing surface for the various possible configurations for the wings 98.

Figure 20A:
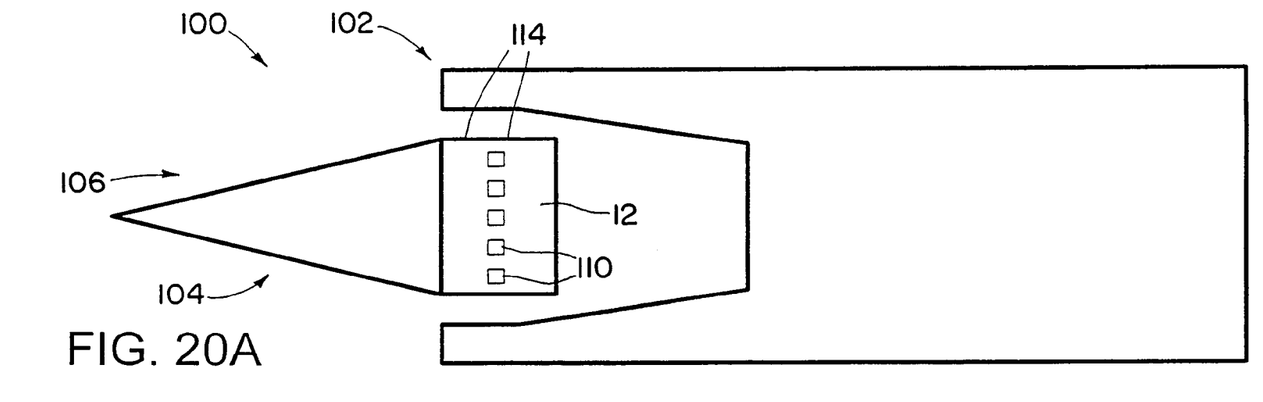
FIG. 20A is a cross sectional view of a configurable jet engine inlet, in accordance with an embodiment of the invention, with the inlet in a first position.
Figure 20B:
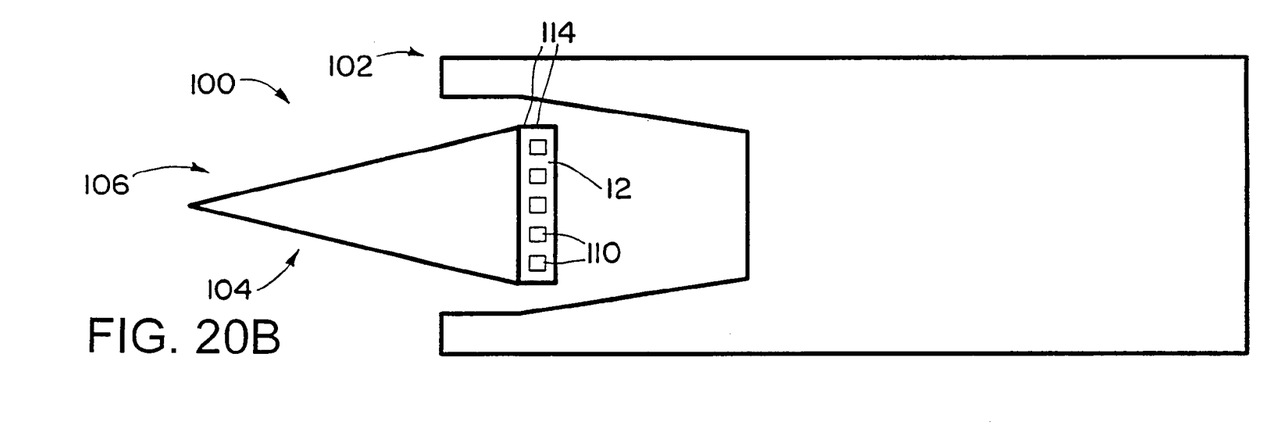
FIG. 20B is a cross sectional view of the configurable jet engine inlet of FIG. 20A, with the inlet in a second position.

FIGS. 20A and 20B shows another possible application for the shape memory polymer material 12, as part of a jet engine 100. The jet engine 100 includes a cowling 102 that surrounds a center body 104, the cowling 102 and the center body 104 together constituting an inlet 106 for the engine 100. Either or both of the cowling 102 and the center body 104 may have shape memory polymer material incorporated therein to change surface shape. Electromagnetic elements 110 may underlie the shape memory polymer material 12 that is part of the cowling 102 or center body 104. The electromagnetic elements 110 may provide suitable electromagnetic fields to put forces on the shape memory polymer material 12, in order to maintain the shape of the shape memory polymer material 12 and/or to provide force for changing the shape of the shape memory polymer material 12. The electromagnetic elements 110 may also provide energy for heating the shape memory polymer material 12, in order to soften the shape memory polymer material 12 so that its shape can be altered. The shape memory polymer material 12 may be covered by overlapping heat resistant plates 114. The heat resistant plates 114 protect the underlying shape memory polymer material 12 from heating by exposure to the combustion reaction in the jet engine 100. The heat-resistant plates 114 may be made of a suitable heat resistant material, for example a suitable ceramic material. Changing the shape of the inlet 106 may allow for reconfiguration of the jet engine 100 for optimal performance in different flow regimes, such as subsonic and supersonic flow regimes.

Figure 21:
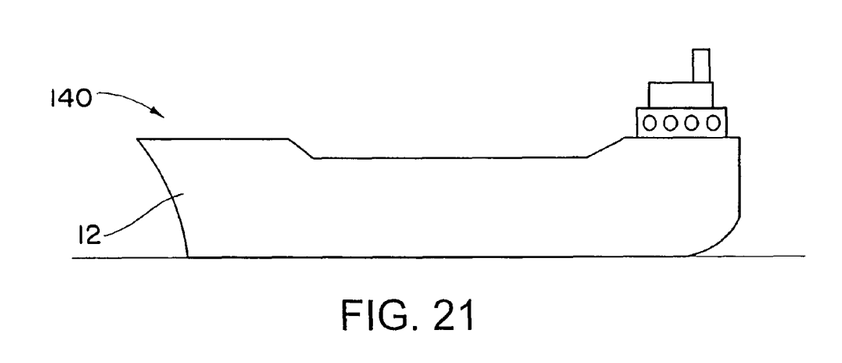
FIG. 21 is an oblique view of a watercraft having a configurable surface shape, in accordance with an embodiment of the invention.
Figure 22:
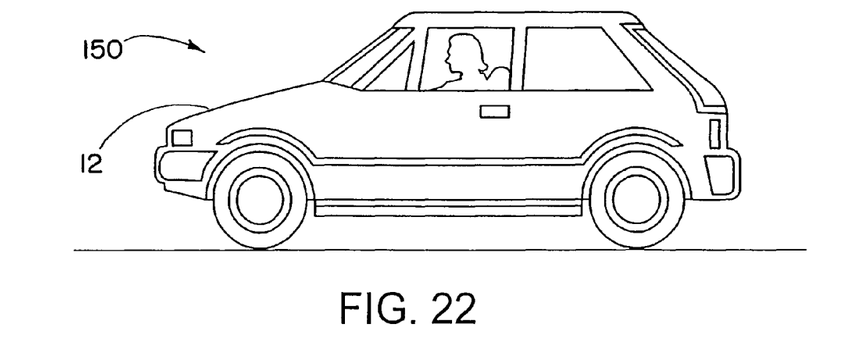
FIG. 22 is an oblique view of a land vehicle having a configurable surface shape, in accordance with an embodiment of the invention.

FIG. 21 illustrates use of the multiple shape memory polymer material 12 as part of the surface of a watercraft 140. FIG. 22 illustrates the shape memory polymer material 12 as part of the surface for a land vehicle 150, a car. The use of the shape memory polymer material 12 may allow changes in shape of the surfaces of the vehicles 140 and 150, allowing reconfiguration of the surfaces to reduce drag or otherwise optimize performance.

Other applications for structural members such as those disclosed above include in mirrors and sunshades. More broadly, the concepts described herein could be used in adjusting the shape or configuration of a wide variety of mechanical structures, such as collapsible/deployable structures, for example space structures. Communications satellites and high precision optics are other possible applications.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A structural member comprising:
   a polymer structural material;
   an electromagnetic field system operatively coupled to the polymer structural material to control shape of the polymer structural material; and
   means for heating the polymer structural material above at least one of a glass transition temperature or a plastic temperature;
   wherein the electromagnetic field system provides increased stiffness for the polymer structural material while the polymer structural material is under external structural load and is above the at least one of a glass transition temperature or a plastic temperature.

2. The structural member of claim 1, wherein the polymer structural material is a shape memory polymer structural material.

3. The structural member of claim 2, wherein the shape memory polymer material includes a shape memory polymer foam.

4. The structural member of claim 3, wherein the shape memory polymer material also includes a gel inside the foam.

5. The structural member of claim 2, wherein the shape memory polymer material includes a neat resin.

6. The structural member of claim 1, wherein the polymer material includes particles that strengthen interaction with the electromagnetic field system.

7. The structural member of claim 6, wherein the particles include magnetic particles.

8. The structural member of claim 6, wherein the particles include particles that increase the dielectric constant of the polymer material.

9. The structural member of claim 1, further comprising a skeleton of rigid material that underlies the polymer material.

10. A structural member comprising:
a polymer structural material;
an electromagnetic field system operatively coupled to the polymer structural material to control shape of the polymer structural material;
means for heating the polymer structural material above at least one of a glass transition temperature or a plastic temperature; and
a skeleton of rigid material that underlies the polymer material;
wherein the skeleton is an articulatable skeleton.

11. The structural member of claim 1, wherein the electromagnetic field system uses an electric field to control shape of the polymer material.

12. The structural member of claim 11, wherein the electromagnetic field system includes an electromagnetic element that includes a capacitor plate within the polymer structural material, wherein the capacitor plate produces an electric field that acts on the polymer structural material.

13. The structural member of claim 1, wherein the electromagnetic field system uses a magnetic field to control shape of the polymer material.

14. The structural member of claim 1, wherein the electromagnetic field system also heats the polymer structural material, to thereby soften the polymer material to enable shape change.

15. The structural member of claim 1, wherein the structural member is part of an aircraft wing.

16. The structural member of claim 1, wherein the means for heating includes heating from the electromagnetic field system.

17. The structural member of claim 1, wherein the means for heating includes heating elements in the polymer structural material that are separate from the electromagnetic field system.

18. The structural member of claim 1, wherein the means for heating include means for microwave heating.

19. The structural member of claim 1, wherein the means for heating includes means for magnetic induction heating.

20. The structural member of claim 1, wherein the means for heating includes means for electrical resistance heating.

21. The structural member of claim 1, wherein the means for heating includes means for thermochemical heating.

22. The structural member of claim 1,
wherein the electromagnetic field system includes:
an electromagnetic source; and
a pair of electromagnetic elements that operatively coupled to the electromagnetic source; and
wherein the electromagnetic elements transmit an electromagnetic field to the polymer structural material.

23. The structural member of claim 22, wherein the electromagnetic elements are on opposite respective sides of the polymer structural material.

24. A structural member comprising:
a polymer structural material;
means for heating the polymer structural material above at least one of a glass transition temperature or a plastic temperature; and
electromagnetic means to control shape of the polymer structural material when the polymer structural material is above the at least one of a glass transition temperature or a plastic temperature;
wherein the electromagnetic means provides increased stiffness for the polymer structural material while the polymer structural material is under external structural load and is above the at least one of a glass transition temperature or a plastic temperature.

25. The structural member of claim 24, wherein the means for heating includes means for electromagnetic heating.

26. The structural member of claim 24, wherein the means for heating includes heating elements in the polymer structural material that are separate from the electromagnetic means.

27. The structural member of claim 24, wherein the means for heating include means for microwave heating.

28. The structural member of claim 24, wherein the means for heating includes means for magnetic induction heating.

29. The structural member of claim 24, wherein the means for heating includes means for electrical resistance heating.

30. The structural member of claim 24, wherein the means for heating includes means for thermochemical heating.

* * * * *